(12) United States Patent  
Wakiyama (10) Patent No.: US 11,239,608 B2
(45) Date of Patent: Feb. 1, 2022

(54) INFORMATION PROCESSING DEVICE (71) Applicant: PANASONIC INTELLECTUAL PROPERTY MANAGEMENT CO., LTD., Osaka (JP)

(72) Inventor: Yasuzi Wakiyama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/116,803

(22) Filed: Dec. 9, 2020

(65) Prior Publication Data
US 2021/0249817 A1 Aug. 12, 2021

(30) Foreign Application Priority Data

Feb. 6, 2020 (JP) .............................. JP2020-018825

(51) Int. Cl.
H01R 13/639 (2006.01)
H01R 13/72 (2006.01)
H01R 13/518 (2006.01)
H01R 13/58 (2006.01)
G06K 7/08 (2006.01)
(Continued)

(52) U.S. Cl.
CPC ....... H01R 13/6392 (2013.01); G06K 7/0013 (2013.01); G06K 7/087 (2013.01); G06K 7/10366 (2013.01); H01R 13/5833 (2013.01); H01R 13/72 (2013.01); H01R 13/518 (2013.01)

(58) Field of Classification Search
CPC .. H01R 13/5833; H01R 13/562; H01R 13/58; H01R 13/583; H05K 5/0247
See application file for complete search history.

(56) References Cited

U.S. PATENT DOCUMENTS 6,527,581 B1 * 3/2003 Wang ..................... H01R 13/72
                                                     439/4
7,198,506 B2 * 4/2007 Furuya ............... H01R 13/5833
                                                     439/456
(Continued)

FOREIGN PATENT DOCUMENTS

JP       61-076996       5/1986
JP       61-171108      10/1986
(Continued)

Primary Examiner — Briggitte R. Hammond
(74) Attorney, Agent, or Firm — Greenblum & Bernstein, P.L.C.

(57) ABSTRACT

An information processing apparatus includes a recess formed on a bottom surface of a housing of the information processing apparatus; a connector provided in the recess; a hook being a pair of protrusions for winding and fixing the cable and provided in the recess; and an open space opening from the recess to a side surface of the housing. The protrusion has a winding portion protruding from a bottom surface of the recess, and a holding portion formed by bending and extending the winding portion. One protrusion in a first hook is arranged within a predetermined distance from the open space, and one protrusion in a second hook is arranged adjacent to the protrusion of the first hook. The protrusions of the first and second hooks are arranged so that the holding portions in the first and second hooks are alternately opposed to each other, and are partially overlapped.

4 Claims, 6 Drawing Sheets (51) Int. Cl.
*G06K 7/10* (2006.01)
*G06K 7/00* (2006.01)

(56) References Cited

U.S. PATENT DOCUMENTS

| | | | |
|---|---|---|---|
| 7,952,886 B2* | 5/2011 | Mikami | H01R 4/64 |
| | | | 361/752 |
| 2003/0092309 A1* | 5/2003 | Maruyama | G02B 6/4441 |
| | | | 439/456 |

FOREIGN PATENT DOCUMENTS

| | | |
|---|---|---|
| JP | 64-039687 | 3/1989 |
| JP | 01-076083 | 5/1989 |
| JP | 01-095785 | 6/1989 |
| JP | 2001-345572 | 12/2001 |
| JP | 2006-228872 | 8/2006 |
| JP | 2010-123976 | 6/2010 |
| JP | 2018-156933 | 10/2018 |

\* cited by examiner

INFORMATION PROCESSING DEVICE

CROSS-REFERENCE TO RELATED APPLICATIONS

This application is based on and claims priority under 35 USC 119 from Japanese Patent Application No. 2020-018825 filed on Feb. 6, 2020, the contents of which are incorporated herein by reference.

TECHNICAL FIELD

The present disclosure relates to an information processing apparatus.

BACKGROUND ART

The information processing apparatus is generally provided with a cable fixing structure at a connection portion that connects cables such as a signal cable and a power cable to a main body of the device. By fixing the cable and connecting the cable to a terminal in the cable fixing structure, connection failure due to pulling of the cable at the time of use can be prevented.

As a related-art technique of a cable fixing structure in electronic equipment or the like, for example, there is provided a locking structure in which a plurality of columnar stoppers are spaced apart from each other at an interval for inserting a power cord in order to lock the power cord with respect to a housing (see Patent Literature 1). Further, there is provided a power cord fixing structure having a plurality of column members formed on a panel constituting electronic equipment, with which a power cord is wound across the plurality of column members and fixed (see Patent Literature 2). Further, there is provided a structure inside a case of electronic equipment, in which one or a plurality of protrusions for entwining a lead wire is provided (see Patent Literature 3).

CITATION LIST

Patent Literature

Patent Literature 1: JP-A-2010-123976
Patent Literature 2: JP-A-2001-345572
Patent Literature 3: JP-U-H01-76083

SUMMARY OF INVENTION

There is a need for further improvements in cable accommodation and fixation in a cable connection part of an information processing apparatus. In particular, when a plurality of cables is connected, the cables may get loose and usability may be reduced.

The present disclosure has been made in view of the above-described circumstances, and an object thereof is to provide an information processing apparatus capable of improving cable accommodation performance of a cable connection part.

According to one aspect of the present disclosure, there is provided an information processing apparatus having a recess that is formed on a bottom surface of a housing of the information processing apparatus; a connector that is provided in the recess and is connected to a cable; a hook that is a pair of protrusions for winding and fixing the cable, a plurality of the hooks being provided in the recess; and an open space that is formed by opening from the recess to a side surface of the housing adjacent to one end of the recess. Each of the pair of protrusions includes a winding portion protruding from a bottom surface of the recess, and a holding portion formed by bending and extending the winding portion so as to lie down. The holding portions of the pair of protrusions extend in a direction in which the holding portions intersect each other, and tips of both the holding portions are directed in opposite directions. One of the pair of the protrusions in a first hook is arranged within a predetermined distance from the open space. One of the pair of the protrusions in a second hook is arranged adjacent to the protrusion of the first hook. The cable is inserted between the protrusion of the first hook and the protrusion of the second hook. The protrusion of the first hook and the protrusion of the second hook are arranged so that the holding portions in the first and second hooks are alternately opposed to each other, and are partially overlapped.

According to the present disclosure, it is possible to improve the cable accommodation performance of the cable connection part.

BRIEF DESCRIPTION OF DRAWINGS

FIGS. 1A to 1C are views illustrating an outer appearance of a settlement terminal according to an embodiment, in which FIG. 1A is a top view.

DESCRIPTION OF EMBODIMENTS

Hereinafter, embodiments of an information processing apparatus according to the present disclosure will be described in detail with reference to the accompanying drawings. However, detailed descriptions more than necessary may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided to provide a thorough understanding of the present disclosure by those skilled in the art, and are not intended to limit the subject matter recited in the claims.

Also, as an example of the information processing apparatus according to the embodiment, a settlement terminal will be described as an example, and a configuration example applied to a housing of the settlement terminal will be described.

Figure 1A:
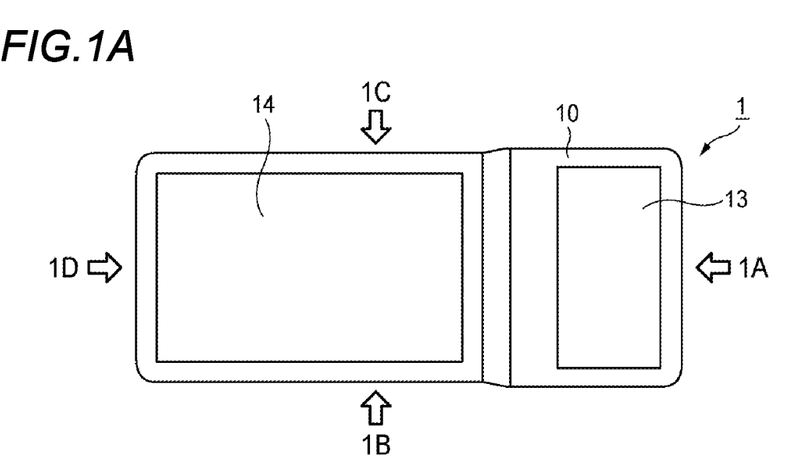
Figure 1B:
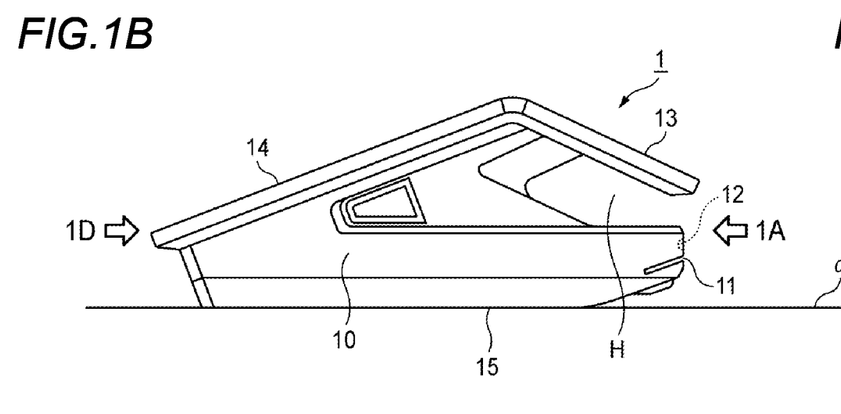
FIG. 1B is a side view.
Figure 1C:
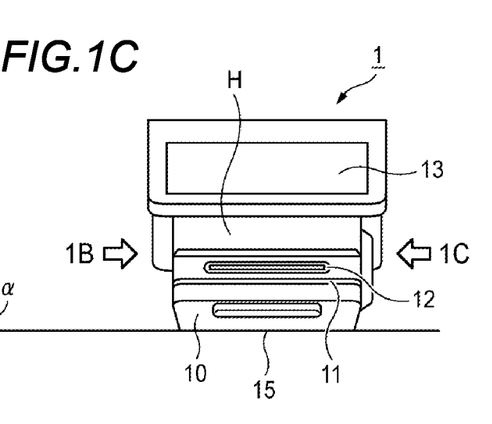
FIG. 1C is a front view.

FIGS. 1A to 1C are views illustrating an outer appearance of the settlement terminal according to the embodiment, in which FIG. 1A is a top view, FIG. 1B is a side view, and FIG. 1C is a front view.

The settlement terminal 1 includes a main body 10. The main body 10 generally presents a box-like shape. In FIGS. 1A to 1C, a front face 1A, side faces 1B and 1C, and a back face 1D of the settlement terminal 1 are illustrated. The settlement terminal 1 is placed on a placement surface a such as a counter of a store and used, for example. In using the settlement terminal 1, a user who performs settlement operates a card or the like from the front face 1A side. In addition, in using the settlement terminal 1, an employee or the like of the store operates the settlement terminal 1 from the back face 1D side. The settlement terminal 1 is connected to an external device of a settlement system server or the like via a cable, and is installed in a store or the like so as to be movable in a range that the cable reaches.

The settlement terminal 1 may be a composite type that allows the user to choose from a plurality of settlement methods. In the settlement terminal 1, in a height direction from a bottom surface 15 adjacent to the placement surface a, a slot 11 for settlement of a magnetic card, a slot 12 for settlement of a contact IC card, and a first upper surface 13 having a touch region for contactless settlement are arranged in this order from near the bottom surface 15. Among the three types of settlement methods of the magnetic card settlement, the contact IC card settlement, and the contactless settlement, the first upper surface 13 having the touch region for contactless settlement is provided at a portion farthest from the bottom surface 15 in the height direction. It should be noted that there is no intention of excluding provision of means corresponding to other settlement methods.

In addition, the slot 11 for settlement of a magnetic card, the slot 12 for settlement of a contact IC card, and the first upper surface 13 having the touch region for contactless settlement are all gathered on the front face 1A side facing the user who performs settlement. With this configuration, the user may select any one of the plurality of settlement methods arranged in front, and thus it is easy for the user to understand. Since a plurality of settlement methods are gathered at one place, a settlement operation of each settlement method becomes smooth.

The settlement terminal 1 may be provided with a gap H. The gap H may be provided between an arrangement position of the first upper surface 13 having a touch region for contactless settlement and an arrangement position of the slot 12 for settlement of a contact IC card. The gap H separates a region used for a contactless settlement method and a region used for the other settlement method (contact IC card and magnetic card).

More specifically, as illustrated in the drawing, the gap H may be opened over a gap side (face illustrated in FIG. 1C) of the slot 12 for settlement of a contact IC card and the two side face sides (face illustrated in FIG. 1B, and a back face thereof) adjacent to the gap H. By providing this gap H, when the user operates a card or the like (particularly when swiping a magnetic card), the user's hand does not collide with the settlement terminal 1, and a smooth settlement operation can be performed.

An upper part of the settlement terminal 1 presents a chevron shape as viewed from the side (see FIG. 1B). One side of the chevron shape corresponds to the first upper surface 13 having a touch region for contactless settlement. That is, the first upper surface 13 is a surface used by the user of the settlement terminal 1 to perform settlement. The other side of the chevron shape corresponds to a second upper surface 14 which is an operation surface of the store side.

The second upper surface 14 may include a display unit that displays an operation screen. This operation screen may be, for example, a touch panel type operation screen. Further, a physical key (button) or the like other than the touch panel may be provided. A store tender or the like of the store side can operate the settlement terminal 1 using the operation screen provided on the second upper surface 14.

Further, after settlement by the user is performed, the settlement terminal 1 may print and output a receipt or the like. A part (not shown) capable of storing roll paper for receipt may be provided inside the settlement terminal 1. Here, the operation screen (second upper surface 14) can be used as a storage lid of the roll paper. For example, the settlement terminal 1 may be configured such that the storage lid is opened by being rotated about a rotation shaft arranged at an end portion of the second upper surface 14.

Figure 2:
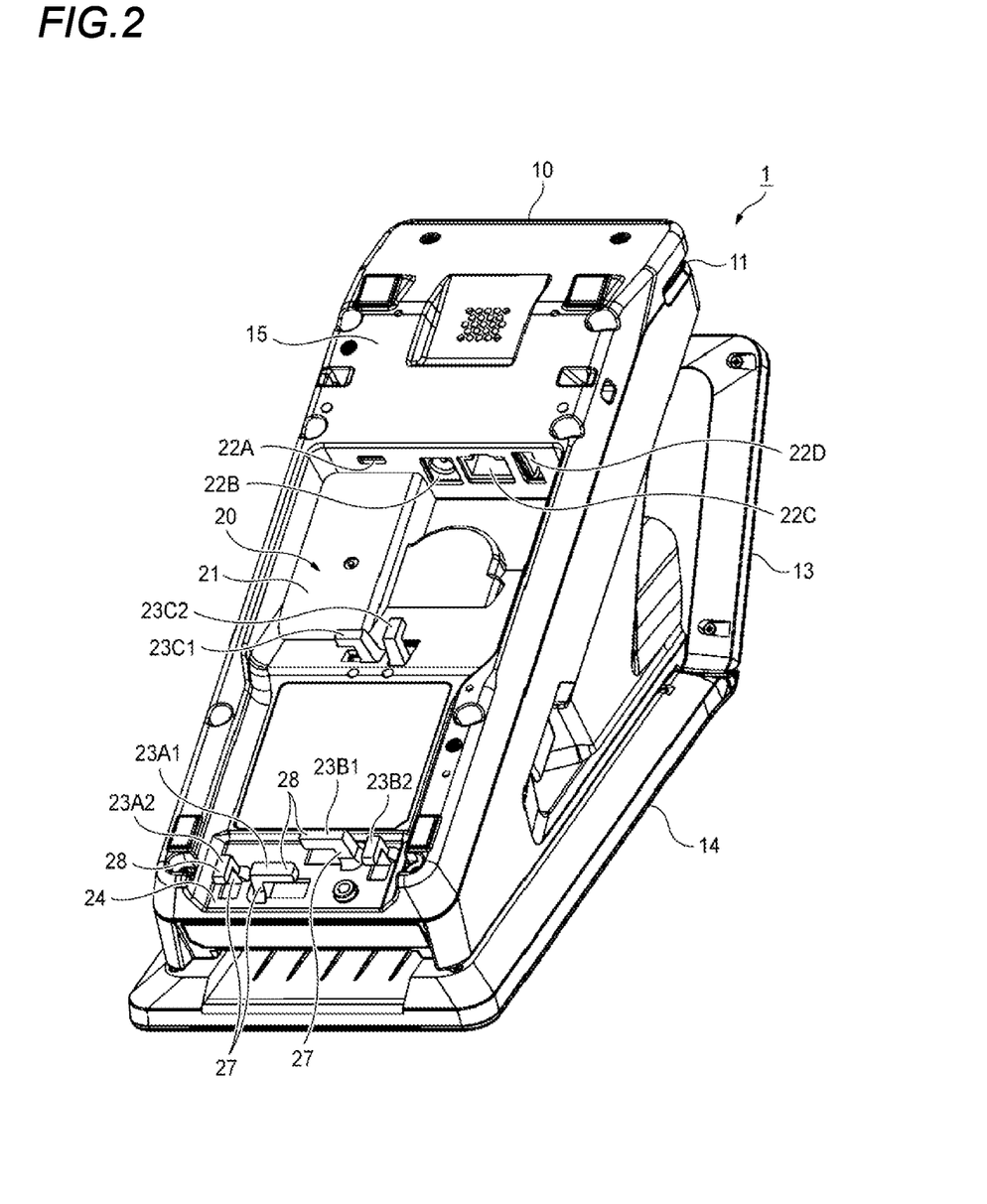
FIG. 2 is a perspective view illustrating a configuration of a bottom surface portion including a cable connection part of an information processing apparatus according to the embodiment.
Figure 3:
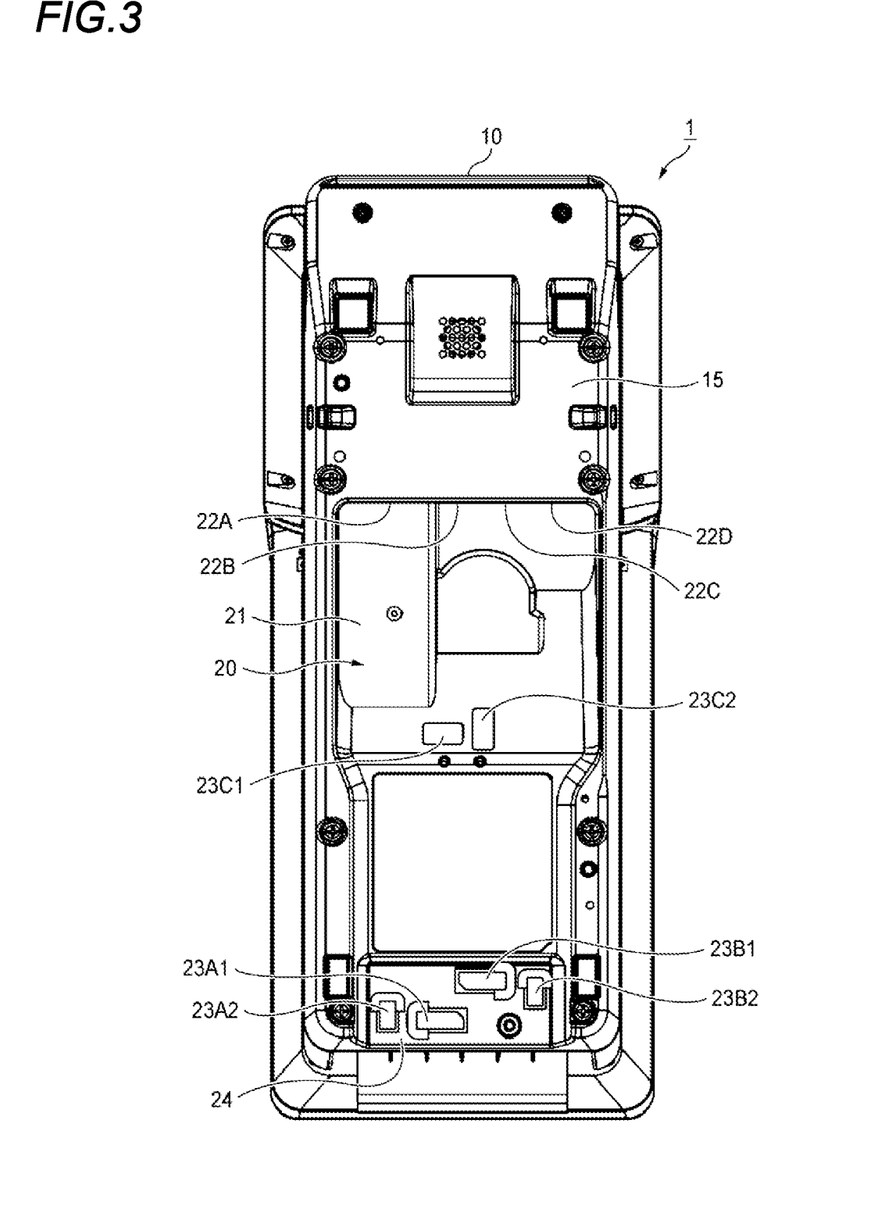
FIG. 3 is a plan view of the bottom surface portion including the cable connection part of the information processing apparatus according to the embodiment.

FIG. 2 is a perspective view illustrating a configuration of a bottom surface portion including a cable connection part of the information processing apparatus according to the embodiment. FIG. 3 is a plan view of the bottom surface portion including the cable connection part of the information processing apparatus according to the embodiment.

The settlement terminal 1 as an information processing apparatus has a recess 21 on the bottom surface portion exposed to a bottom surface 15. The recess 21 is provided with a cable connection part 20 where a plurality of cables are connected and accommodated. The cable connection part 20 includes a connector 22, a hook 23, and an open space 24. Here, the plurality of connectors 22A, 22B, 22C, and 22D are collectively referred to as connector 22. A plurality of hooks 23A1, 23A2, 23B1, 23B2, 23C1, and 23C2 are collectively referred to as hook 23. The connector 22 has a connector for connecting a terminal provided at an end portion of a cable. In the illustrated example, four connectors 22A, 22B, 22C, and 22D are provided.

The hook 23 is also referred to as a cable guide, a clamp, or the like, and includes a pair of projections for winding and fixing a cable connected to the connector 22. The projection of the hook 23 includes a winding portion 27 that protrudes from a bottom surface of the recess 21, and a holding portion 28 that is formed by bending and extending the winding portion 27 so as to lie down. The hook 23 has a so-called L-shaped clamp configuration in which the winding portion 27 and the holding portion 28 are bent, for example, at a right angle or within a predetermined angle with respect to a right angle. The hook 23A1 and the hook 23A2, the hook 23B1 and the hook 23B2, and the hook 23C1 and the hook 23C2 are arranged as a pair respectively. With respect to the hook 23, the holding portions of a pair of projections extend in direction in which the holding portions intersect each other (for example, orthogonal directions, other than parallel directions), and tips of both holding portions are directed in directions opposite to each other (directions of getting away from each other). In addition, the holding portion of the hook 23A1 and the holding portion of the hook 23B1 extend in directions opposite to each other, and the holding portion of the hook 23A2 and the holding portion of the hook 23B2 extend in a direction directing toward the back face 1D where the open space 24 is provided.

The hooks 23A1 and 23A2 and the hooks 23B1 and 23B2 are disposed near the open space 24. The hooks 23C1 and 23C2 are disposed between the hooks 23A1, 23A2, 23B1 and 23B2 and the connector 22. The arrangement of the hooks 23A1 and 23B1 will be described later.

The open space 24 is formed by a cutout portion cut out from the bottom surface 15 of the main body 10 to the back face 1D (see FIGS. 1A to 1C). The open space 24 is a portion that opens toward the back face 1D adjacent to one end of the recess 21 of the bottom surface 15, and serves as a cable port. In the open space 24, a cable connected to the connector 22 is configured to exit to the outside along a lateral side of the information processing apparatus. In other words, the cable to be connected to the settlement terminal 1 is drawn from a space of the open space 24 to the inside of the device and is connected to the connector 22.

Figure 4:
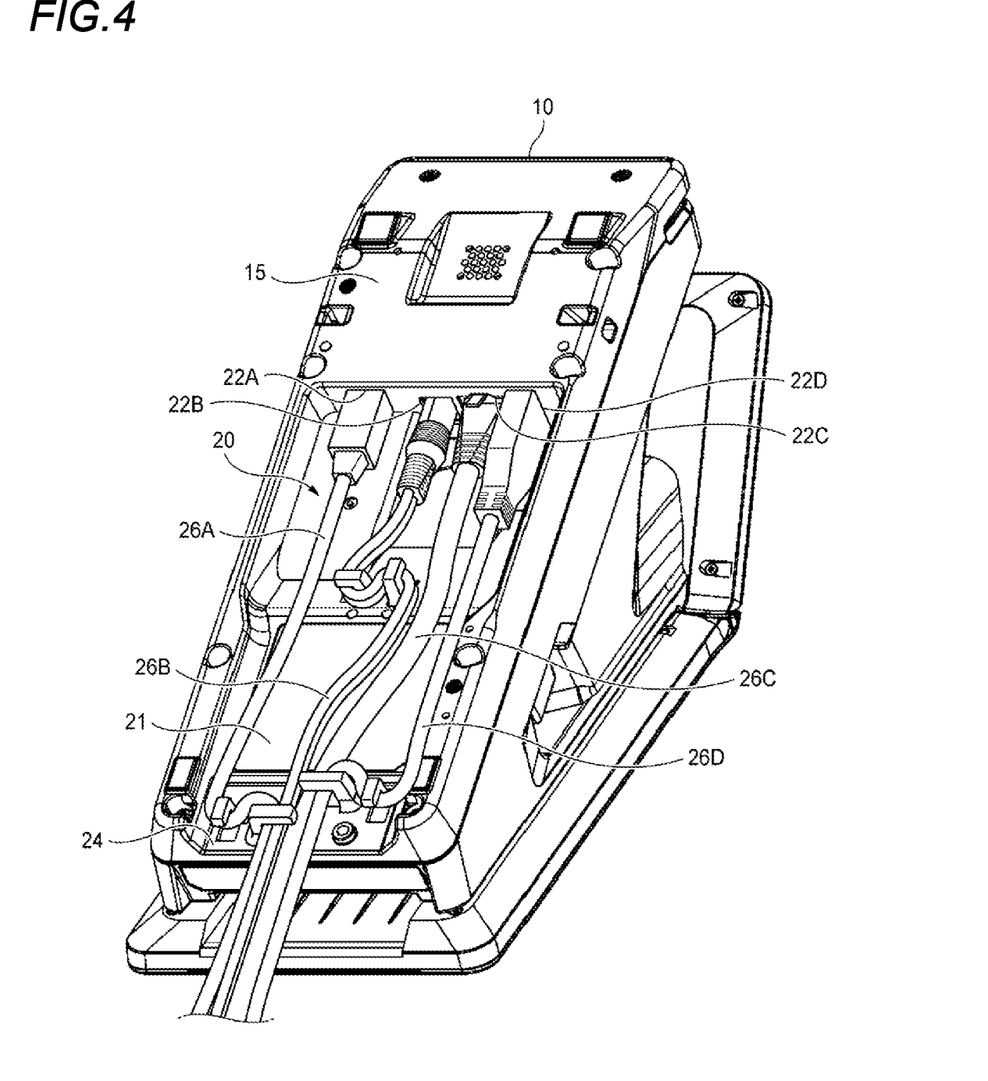
FIG. 4 is a perspective view illustrating a state where cables are connected to the cable connection part according to the embodiment.
Figure 5:
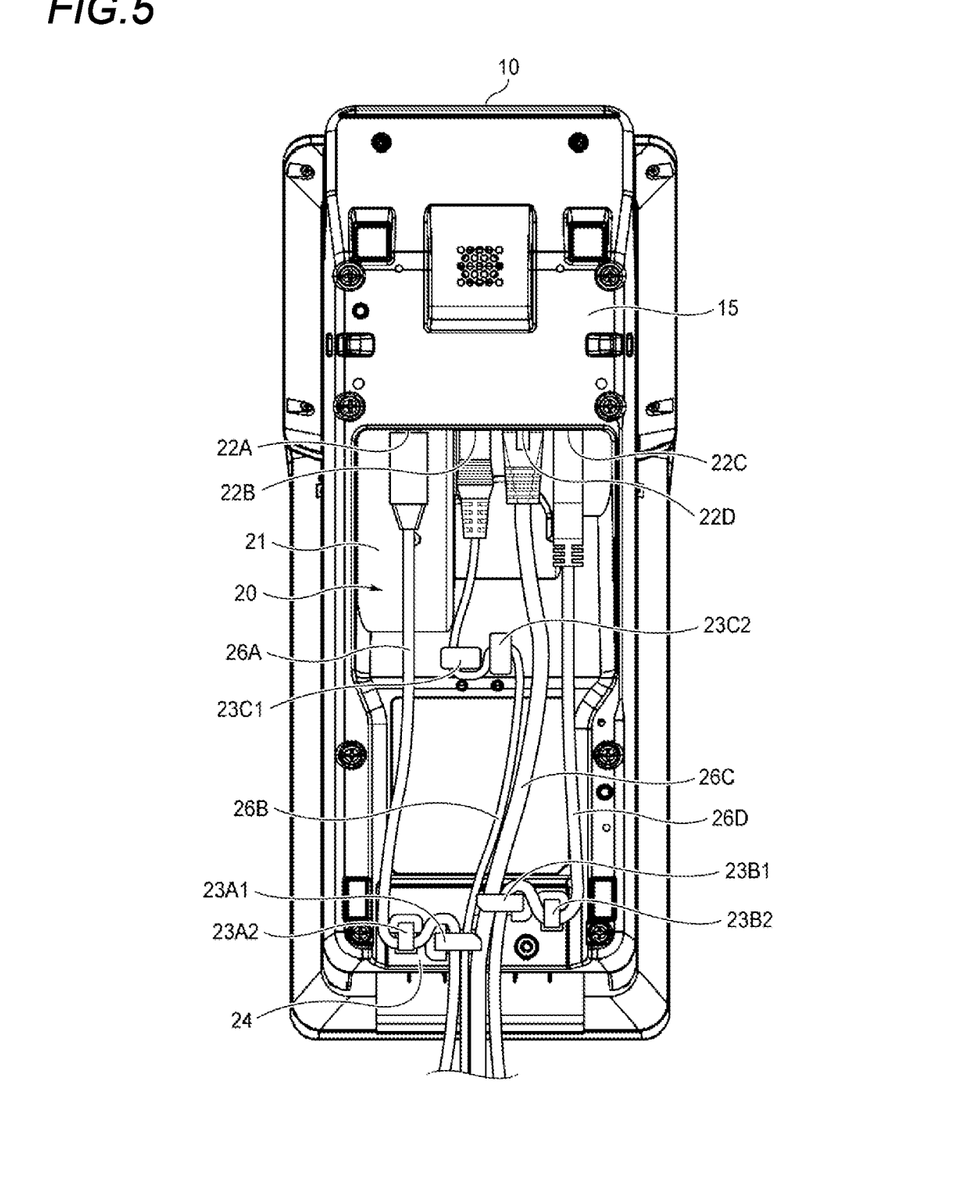
FIG. 5 is a plan view illustrating a state where a plurality of cables connected to the cable connection part according to the embodiment is fixed.

FIG. 4 is a perspective view illustrating a state where cables are connected to the cable connection part according to the embodiment. FIG. 5 is a plan view illustrating a state where a plurality of cables connected to the cable connection part according to the embodiment is fixed.

In the cable connection part 20, a first cable 26A, a second cable 26B, a third cable 26C, and a fourth cable 26D are connected to the connector 22A, the connector 22B, the connector 22C, and the connector 22D, respectively. In the drawing, the first cable 26A is exemplified as a first USB cable, the second cable 26B as a power cable, the third cable 26C as a LAN cable, and the fourth cable 26D as a second USB cable. These cables 26A to 26D are drawn into the device from the open space 24, and terminals thereof are fitted and connected to the respective connectors 22A to 22D. Here, the plurality of cables 26A to 26D is collectively referred to as cable 26.

As illustrated in FIG. 5, the first cable 26A is fixed by being entwined around the winding portions of the hook 23A1 and the hook 23A2 in a substantially rectangular direction for twice, that is, in an S-shape or inverted S-shape at a middle portion thereof. At this time, the first cable 26A is entwined so as to wind around the winding portion of the hook 23A2 and the winding portion of the hook 23A1 in directions different from each other, and is inserted through an inner side of the holding portion of the hook 23A1 and is accommodated therein. Similarly, the fourth cable 26D is fixed by being entwined around the winding portions of the hook 23B1 and the hook 23B2 in an S-shape or inverted S-shape at a middle portion thereof. At this time, the fourth cable 26D is entwined so as to wind around the winding portion of the hook 23B2 and the winding portion of the hook 23B1 in directions different from each other, and is inserted through an inner side of the holding portion of the hook 23B1 and is accommodated therein.

Similarly, the second cable 26B is fixed by being entwined around the winding portions of the hook 23C1 and the hook 23C2 in an S-shape or inverted S-shape at a middle portion thereof. In addition, the second cable 26B is inserted through the inner sides of the holding portions of the hook 23A1 and the hook 23B1, and is restricted to the bottom surface side of the recess 21 so as not to move to outer sides thereof. At this time, the second cable 26B is entwined so as to wind around the winding portion of the hook 23C2 and the winding portion of the hook 23C1 in directions different from each other, and is inserted through the inner sides of the holding portions of the hook 23A1 and the hook 23B1 and is accommodated therein. The third cable 26C is inserted through the inner sides of the holding portions of the hook 23A1 and the hook 23B1, and is restricted to the bottom surface side of the recess 21 so as not to move to outer sides thereof. Since the third cable 26C as the LAN cable has, at a terminal portion of a cable end thereof, a lock mechanism for fixing a terminal thereof to the connector, the hook 23 for fixation is not provided therefor, and a position of the third cable 26C is restricted by the holding portions of the hook 23 as the other cables.

Here, the hook 23A1 and the hook 23B1 constitute a cable insertion portion through which the plurality of cables 26A to 26D connected to the connector 22 is inserted. The hook 23A1 and the hook 23B1 are two projections positioned adjacent to each other in the vicinity of the open space 24, that is, within a predetermined distance from the open space. The hook 23A1 and the hook 23B1 are arranged in parallel to each other or within a predetermined angle with respect to being parallel such that the holding portions of the two projections face each other in a staggered manner, and both tips of the holding portions thereof extend in opposite directions. The hook 23A1 and the hook 23B1 are formed so as to partially overlap (overlap) in an extension direction of the holding portion, and overlapping portions thereof are arranged substantially parallel to each other. Further, in the hook 23A1 and the hook 23B1, two adjacent projections that constitute the cable insertion portion are positioned at a distance within a predetermined length from a total thickness of the plurality of cables inserted between the hooks. For example, in a case where four cables 26A to 26D are to be inserted between the hook 23A1 and the hook 23B1, an interval between the two projections of the hooks may be 25 mm or less. Therefore, the plurality of cables 26A to 26D are collectively positioned adjacent to each other and restricted by the cable insertion portion between the hook 23A1 and the hook 23B1.

With the above configuration, each of the plurality of cables 26A to 26D is fixed by the hook 23, and is restricted so as not to protrude to an outer side. All the cables 26A to 26D are inserted between the hook 23A1 and the hook 23B1, and are bundled together in a bundle in the vicinity of an outer wall of the back face 1D of the main body 10 by the hooks 23A1 and 23B1. Accordingly, a bundle of cables 26A to 26D connected to the information processing apparatus are arranged so as to extend outward from the open space 24.

In the present embodiment, by arranging the hook 23 as in the above configuration in a recess space having a depth just allowing the cables connected to the information processing apparatus to be accommodated therein, the plurality of cables can be appropriately fixed and accommodated. Therefore, it is possible to collectively fix the plurality of cables without making the recess space deeper than necessary to provide an extra accommodation space. For example, a depth of the recess 21 constituting the cable connection part 20 may be such a depth as to accommodate one cable, and may be 10 mm or less.

In a related-art configuration in which a general hook is provided, a position of each cable is not stabilized, and the cable may float up and ride on a surrounding structure. In addition, the plurality of cables may become loose at a cable port. As described above, there is a problem that the plurality of cables is messy and deterioration of usability occurs.

In contrast, according to the present embodiment, since the plurality of cables can be collectively held and fixed, it is easy to handle the cables, and when a user performs a settlement operation, it is possible to prevent the cable from interfering with the operation. At this time, since the plurality of cables is restricted by the hook 23A1 and the hook 23B1 disposed to face each other, positions of the cables are stably maintained. Accordingly, since the plurality of cables are collected in the vicinity of the open space serving as the cable port, wiring processing outside the information processing apparatus is not required. In the present embodiment, it is possible to improve convenience by improving a cable fixing and accommodation structure to allow a plurality of cables to be collectively accommodated and fixed.

Figure 6:
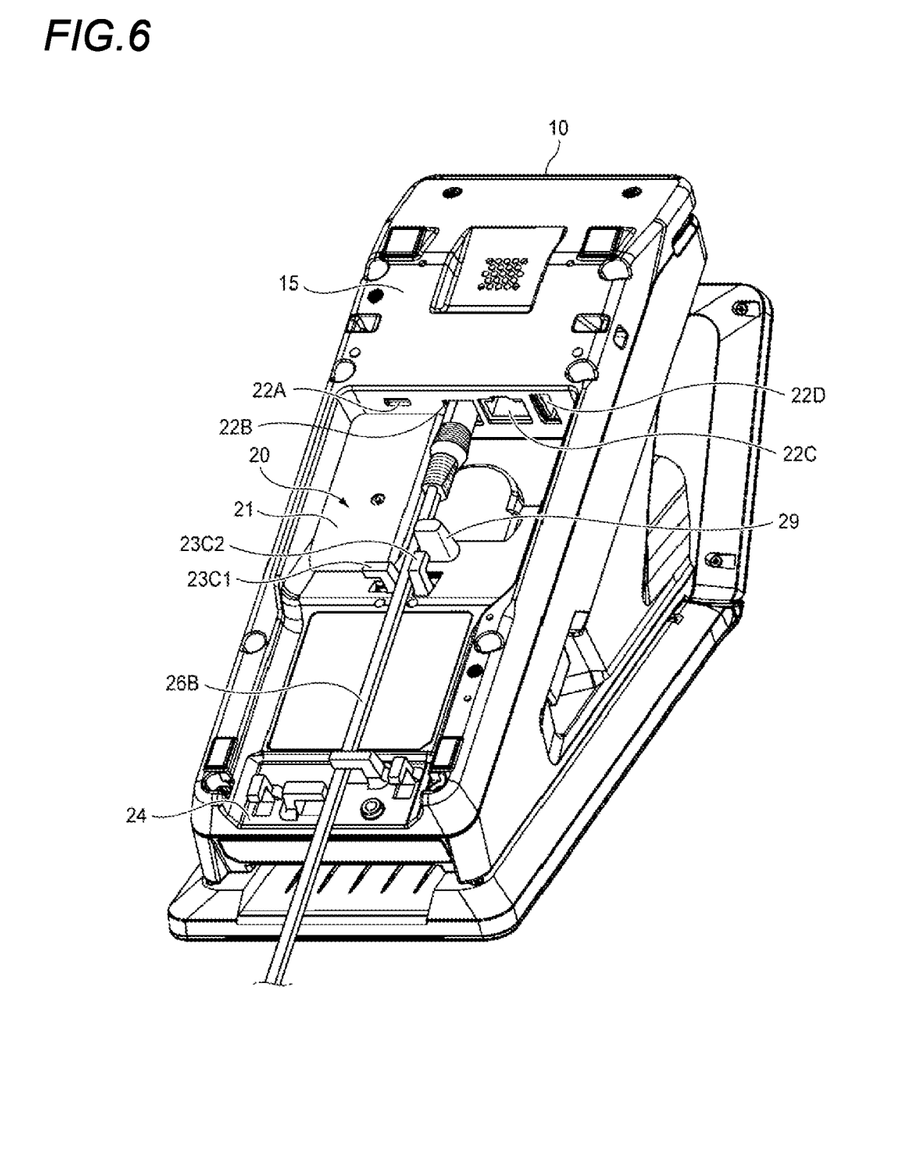
FIG. 6 is a perspective view illustrating a modification of a configuration of the cable connection part of the information processing apparatus according to the embodiment.

FIG. 6 is a perspective view illustrating a modification of a configuration of the cable connection part of the information processing apparatus according to the embodiment.

In a cable connection part 20A of the modification, a guard member 29 protruding in the vicinity of the hook 23 is provided in the recess 21. In the illustrated example, the guard member 29 is disposed between the hooks 23C1 and 23C2 and the connectors 22A to 22D, at a position closer to the hook within a predetermined distance from the hooks 23C1 and 23C2. A projection of the guard member 29 has a standing prismatic shape rising from the bottom surface of the recess 21, and has a trapezoidal cross section, and corners thereof are chamfered or rounded. With respect to a size of the guard member 29, at least one side surface thereof has a width similar to that of a human finger, and the width of the side surface is about 5 mm to 10 mm. A height of the projection of the guard member 29 is equal to heights of the hooks 23C1 and 23C2.

With the above configuration, since a movable range of the user's fingers is restricted by the guard member 29, the user's fingers are prevented from reaching the hooks 23C1 and 23C2 in detaching a cable such as the second cable 26B from the connector 22.

In a case where the hook is disposed near the connector, the user's fingers may hit the hook when the user grips the cable with fingers to pull out the cable. In contrast, according to the present embodiment, since movement of the fingers is guarded in front of the hooks 23C1 and 23C2 by the guard member 29, it is possible to prevent the user's fingers from hitting the hook.

The information processing apparatus having the cable connection part according to the present embodiment can be applied to various types of information processing apparatus installed and used in a store or the like, such as a settlement terminal, a personal computer, a terminal of communication equipment or the like, and electronic equipment including a display, a processor, and the like.

As described above, the information processing apparatus of the present embodiment includes the cable connection part 20 that connects the cables. The cable connection part 20 is provided in the recess 21 formed on a bottom surface or a side surface of the housing of the information processing apparatus, and includes the connector 22 to which the cable 26 is connected, the hook 23 including a pair of projections for winding and fixing the cable 26, and an open space 24 opening to a side surface adjacent to one end of the recess 21. The projection of the hook 23 has a winding portion 27 that protrudes from the bottom surface of the recess 21, and a holding portion 28 that is bent and extends out with respect to the winding portion 27. A plurality of hooks 23 are provided in the cable connection part 20, and among the plurality of hooks 23, the projections of the two hooks 23A1 and 23B1 positioned adjacently to each other within a predetermined distance from the open space 24 constitute the cable insertion portion through which the cable 26 connected to the connector 22 is inserted. The holding portions 28 of the two projections of the hooks 23A1 and 23B1 are arranged so as to face each other in a staggered manner, and are formed so as to partially overlap with each other in the extension direction of the holding portion 28.

Accordingly, the two hooks 23A1 and 23B1 adjacent to each other in the vicinity of the open space 24 constitute the cable insertion portion, and the cables connected to the connector 22 can be collectively held and fixed in the cable insertion portion. Therefore, cable accommodation performance of the cable connection part 20 can be improved.

Further, with respect to each pair of projections of the hook 23, the holding portions 28 thereof extend out in directions intersecting with each other, and the tips of both holding portions 28 are directed in directions opposite to each other. Accordingly, when fixing the cable by a pair of hooks, the cable is fixed by being entwined around the winding portions of the hook in an S-shape or inverted S-shape, so that the cable can be easily and reliably fixed.

The projections of the two hooks 23A1 and 23B1 constituting the cable insertion portion are located at a distance within a predetermined length from a total thickness of the cables 26 inserted into the cable insertion portion. Accordingly, all the cables are bundled together in a single bundle in the cable insertion portion so as to be accommodated.

Further, the guard member 29 protruding from the bottom surface of the recess 21 is provided at a position within a predetermined distance from the hook 23 between the hook 23 and the connector 22. Accordingly, since the movable range of the user's fingers is restricted by the guard member 29, the user's fingers are prevented from going to the hook 23 in detaching the cable 26 from the connector 22.

Further, with respect to the guard member 29, at least one side surface thereof has a width similar to that of a human finger, and the height thereof is equal to the height of the projection of the hook 23. Accordingly, it is possible to prevent the user's fingers from hitting the hook 23.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the above-described embodiments may be combined freely within a range not departing from the spirit of the invention.

INDUSTRIAL APPLICABILITY

The present disclosure has an effect of capable of improving cable accommodation performance of a cable connection part, and is useful as, for example, an information processing apparatus such as a settlement terminal.

What is claimed is:
1. An information processing apparatus comprising:
a recess that is formed on a bottom surface of a housing of the information processing apparatus;
a connector that is provided in the recess and is connected to a cable;
a hook that is a pair of protrusions for winding and fixing the cable, a plurality of the hooks being provided in the recess; and
an open space that is formed by opening from the recess to a side surface of the housing adjacent to one end of the recess, wherein:
each of the pair of protrusions includes
a winding portion protruding from a bottom surface of the recess, and
a holding portion formed by bending and extending the winding portion so as to lie down,
the holding portions of the pair of protrusions extend in a direction in which the holding portions intersect each other, and tips of both the holding portions are directed in opposite directions, one of the pair of the protrusions in a first hook is arranged within a predetermined distance from the open space, one of the pair of the protrusions in a second hook is arranged adjacent to the protrusion of the first hook, the cable is inserted between the protrusion of the first hook and the protrusion of the second hook, and the protrusion of the first hook and the protrusion of the second hook are arranged so that the holding portions in the first and second hooks are alternately opposed to each other, and are partially overlapped.

2. The information processing apparatus according to claim 1, wherein:

a plurality of the connectors are provided, a plurality of the cables are inserted between the protrusion of the first hook and the protrusion of the second hook, and a distance between the protrusion of the first hook and the protrusion of the second hook is a length within a predetermined range from a total thickness of the plurality of the cables.

3. The information processing apparatus according to claim 1, further comprising:

a guard member that protrudes from the bottom surface of the recess, is arranged between the hook and the connector, and is arranged within a predetermined distance from the hook.

4. The information processing apparatus according to claim 3, wherein:

at least one side surface of the guard member has a width similar to that of a human finger, and a height of the guard member is equal to a height of the protrusion in the hook.

\* \* \* \* \*